United States Patent
Seegers et al.

(10) Patent No.: US 11,420,558 B2
(45) Date of Patent: Aug. 23, 2022

(54) INTERIOR TRIM PART OF MOTOR VEHICLE WITH THIN-FILM DISPLAY DEVICE

(71) Applicant: International Automotive Components Group GmbH, Duesseldorf (DE)

(72) Inventors: Huib Seegers, Eindhoven (NL); Henk Rijpkema, Baarlo (NL); Carter Scott Cannon, Munich (DE)

(73) Assignee: International Automotive Components Group GmbH, Düsseldorf (DE)

( * ) Notice: Subject to any disclaimer, the term of this patent is extended or adjusted under 35 U.S.C. 154(b) by 0 days.

(21) Appl. No.: 16/468,675

(22) PCT Filed: Dec. 13, 2017

(86) PCT No.: PCT/EP2017/082608
§ 371 (c)(1),
(2) Date: Jun. 11, 2019

(87) PCT Pub. No.: WO2018/109003
PCT Pub. Date: Jun. 21, 2018

(65) Prior Publication Data
US 2020/0070722 A1 Mar. 5, 2020

(30) Foreign Application Priority Data
Dec. 13, 2016 (DE) .................... 10 2016 124 125.3

(51) Int. Cl.
*B60R 1/00* (2022.01)
*B60K 37/06* (2006.01)
(Continued)

(52) U.S. Cl.
CPC ................ *B60R 1/00* (2013.01); *B60K 37/06* (2013.01); *B60Q 9/00* (2013.01); *B60R 11/0235* (2013.01);
(Continued)

(58) Field of Classification Search
CPC . B60R 1/04; B60R 13/0243; B60R 2300/802; B60R 1/00; B60R 11/04;
(Continued)

(56) References Cited

U.S. PATENT DOCUMENTS 5,956,181 A * 9/1999 Lin ........................ B60R 1/12
359/630
6,445,287 B1 * 9/2002 Schofield ............ B60C 23/0401
340/442

(Continued)

FOREIGN PATENT DOCUMENTS

DE 4127656 A1 2/1993
DE 10239579 A1 1/2004
(Continued)

OTHER PUBLICATIONS

S. Kim, K. Sekiyama and T. Fukuda, "User-Adaptive Interface with Reconfigurable Keypad for In-vehicle Information Systems," 2008 International Symposium on Micro-NanoMechatronics and Human Science, 2008, pp. 501-506, doi: 10.1109/MHS.2008.4752504. (Year: 2008).*

(Continued)

*Primary Examiner* — Michael Robert Cammarata
(74) *Attorney, Agent, or Firm* — Grossman, Tucker, Perreault & Pfleger PLLC; Steven J. Grossman (57) ABSTRACT

The disclosure relates to an interior trim part of a motor vehicle which comprises: a shaped part made of glass or a glass-like material which is arranged on the side of the interior trim part facing the interior of the motor vehicle, a thin-film display device which as seen from the motor vehicle interior is arranged behind the shaped part or is integrated therein, and a control device for activating the thin-film display device, so that the latter transmits an image through the shaped part to the interior of the motor vehicle.

28 Claims, 9 Drawing Sheets

(51) Int. Cl.
    *B60Q 9/00*     (2006.01)
    *B60R 11/04*    (2006.01)
    *B60R 13/02*    (2006.01)
    *B60R 11/00*    (2006.01)
    *B60R 11/02*    (2006.01)
    *G06F 3/147*    (2006.01)

(52) U.S. Cl.
    CPC .......... *B60R 11/04* (2013.01); *B60R 13/0243* (2013.01); *G06F 3/147* (2013.01); *B60K 2370/1434* (2019.05); *B60K 2370/152* (2019.05); *B60K 2370/176* (2019.05); *B60K 2370/178* (2019.05); *B60K 2370/21* (2019.05); *B60K 2370/52* (2019.05); *B60K 2370/688* (2019.05); *B60R 2011/0021* (2013.01); *B60R 2300/802* (2013.01)

(58) Field of Classification Search
    CPC ......... B60R 1/20; B60R 1/22; B60K 2370/52; B60K 2370/1434; B60K 37/06; B60K 2370/173; B60K 2370/152; G06F 1/1601; B60Q 9/005
    See application file for complete search history.

(56) References Cited

U.S. PATENT DOCUMENTS

| | | | |
|---|---|---|---|
| 7,855,755 B2* | 12/2010 | Weller | B60R 1/10 349/1 |
| 8,411,245 B2* | 4/2013 | Lee | B60R 1/12 349/73 |
| 8,506,141 B2* | 8/2013 | Cannon | B60R 13/0212 362/490 |
| 9,841,634 B2* | 12/2017 | Park | G02B 30/34 |
| 10,059,259 B2 | 8/2018 | Cannon et al. | |
| 10,442,360 B2* | 10/2019 | LaCross | H04N 5/232 |
| 10,640,046 B1* | 5/2020 | Englander | H04N 5/268 |
| 2006/0164230 A1* | 7/2006 | DeWind | B60K 35/00 340/461 |
| 2007/0146344 A1* | 6/2007 | Martin | G09G 5/00 345/173 |
| 2010/0201816 A1* | 8/2010 | Lee | B60R 1/12 349/1 |
| 2011/0002138 A1 | 1/2011 | Hayes et al. | |
| 2011/0006892 A1 | 1/2011 | Karpinsky | |
| 2011/0175754 A1 | 7/2011 | Karpinsky | |
| 2012/0051067 A1 | 3/2012 | Murray | |
| 2012/0268665 A1* | 10/2012 | Yetukuri | B60K 35/00 348/837 |
| 2014/0211498 A1 | 7/2014 | Cannon et al. | |
| 2014/0247210 A1* | 9/2014 | Henderek | G06F 3/041 345/156 |
| 2015/0298608 A1 | 10/2015 | Aufmkolk | |
| 2016/0089980 A1* | 3/2016 | Kurahashi | G06F 3/013 345/156 |
| 2016/0109947 A1* | 4/2016 | George-Svahn | G06F 1/169 345/156 |
| 2016/0297362 A1* | 10/2016 | Tijerina | G06K 9/00832 |
| 2016/0321914 A1* | 11/2016 | Geerlings | G08C 17/02 |
| 2016/0363994 A1* | 12/2016 | Yokoya | G06F 3/013 |
| 2017/0068093 A1* | 3/2017 | Bouaziz | B60K 35/00 |
| 2017/0221425 A1* | 8/2017 | Lu | B60R 1/088 |
| 2017/0235360 A1* | 8/2017 | George-Svahn | G02B 27/01 345/173 |
| 2017/0327044 A1* | 11/2017 | Baur | G08G 1/167 |
| 2018/0029502 A1* | 2/2018 | Georgiev | G06F 3/0338 |
| 2018/0040248 A1* | 2/2018 | Bigham | H04N 7/181 |
| 2018/0086255 A1* | 3/2018 | Salter | B60Q 3/62 |
| 2018/0154799 A1* | 6/2018 | Lota | B60R 1/00 |
| 2018/0314066 A1* | 11/2018 | Bell | G02B 27/0093 |
| 2019/0012030 A1* | 1/2019 | Morofuji | G06F 3/016 |
| 2019/0135199 A1* | 5/2019 | Galan Garcia | B60R 16/037 |
| 2020/0139814 A1* | 5/2020 | Galan Garcia | B60K 35/00 |

FOREIGN PATENT DOCUMENTS

| | | | |
|---|---|---|---|
| DE | 102004051146 A1 | 5/2006 | |
| DE | 102005005682 A1* | 8/2006 | B60Q 3/745 |
| DE | 102006012606 A1 | 11/2007 | |
| DE | 102011050585 A1 | 11/2012 | |
| DE | 10 2013 100 941 A1 | 7/2014 | |
| DE | 102014103938 A1 | 9/2015 | |
| EP | 2 233 366 A1 | 9/2010 | |
| EP | 2 876 526 A1 | 5/2015 | |
| EP | 3 006 269 A1 | 4/2016 | |

OTHER PUBLICATIONS

International Search Report and Written Opinion of the International Search Report issued in priority PCT/EP2017/082608, dated Feb. 7, 2018.

* cited by examiner

INTERIOR TRIM PART OF MOTOR VEHICLE WITH THIN-FILM DISPLAY DEVICE

FIELD

The disclosure relates to an interior trim part of a motor vehicle which can provide a display for the interior of the motor vehicle.

BACKGROUND

A wide variety of interior lighting systems for motor vehicles is available. They are used for general room lighting or background lighting, or they are used to illuminate individual objects for aesthetic or functional reasons. For interior lighting, light bulbs were previously normally used, in fact both for room lighting as well as for illuminating of individual objects. LEDs are now increasingly being used for lighting. It is also known to integrate lighting systems into interior trim parts, wherein various limitations must be observed, such as the heat generated by the lighting systems, the susceptibility of the lighting systems to damage and the housing of the lighting systems, in such a way that they are inconspicuous and well integrated into the interior trim.

DE 10 2013 100 941 A1 describes an interior trim part which comprises a support component which defines the contours of the interior trim part, a cover layer which is applied on a visible side of the support component, and a light-emitting layer which is applied on a rear side of the support component. The support component and the cover layer are transparent to light.

EP 2 233 366 A1 describes an interior trim part with a backlit decorative layer, wherein a light-conducting and light-emitting layer is incorporated between the support and the decorative layer. The light-conducting and light-emitting layer is located between the support substrate which defines the contours of the interior trim, and a single-layer or multi-layer covering layer. By embedding the light-conducting and light-emitting layer between the support substrate and cover layer, the light-conducting and light-emitting layer is essentially hidden in the deactivated state, and is protected between the covering layer and support substrate.

These described lighting systems are also known in the state of the art as "hidden until lit" lighting systems.

US patent 2011/002138 A1 describes an illuminated interior trim part with integrated switches and sensors, including touch sensors or proximity sensors. "Hidden-until-lit" symbols are located in the interior trim part above switches or sensors, to identify these.

SUMMARY

An interior trim part for a motor vehicle is disclosed which uses light as at least one of a functional and decorative element in the interior of a motor vehicle.

Examples are specified in the claims.

An interior trim part of a motor vehicle is provided which comprises a shaped part made of or comprising glass or a glass-like material which is arranged on the side of the interior trim part facing the interior of the motor vehicle, a thin-film display device which, as seen from the motor vehicle interior, is arranged behind the shaped part or is integrated therein, and a control device for activating the thin-film display device so that the thin-film display device transmits an image through the shaped part into the interior of the motor vehicle. The interior trim part has a variable appearance and can display to the occupants of the vehicle in addition to a decorative surface, for example, control elements for controlling at least one of vehicle functions and camera images, whether they be static or moving images. The interior trim part can provide a decorative illuminated surface as well as ambient lighting, but also can present one or a plurality of displays and/or control elements. The lighting and display functions can take advantage of the "hidden-until-lit" functionality by being visually perceptible when the respective light source or display is active.

The shaped part can include one or more glass layers. It can have, for example, a multi-layered structure, wherein at least one of the layers consists of or comprise glass.

The shaped part can be shaped in three dimensions. It can be configured in the form of an applique which is inserted into a section of interior trim, for example, a door panel.

The shaped part can be transparent or partially transparent, and is for example entirely or mainly produced from glass, wherein the glass can be at least one of coloured and coated. The thin-film display device can comprise a transparent or partially transparent display which allows objects that lie behind the display, that is, on the side of the display facing away from the passenger compartment, to be visually perceived.

For example, the thin-film display device comprises an OLED (organic light-emitting diode) display, a TFT (Thin Film Transistor) display, an LCD (liquid crystal) display, or an SED (surface conduction electron emitter) display.

Touch sensors or proximity sensors can be integrated into the thin-film display device, e.g. a transparent ITO film display, into at least one of the shaped part and into the electronics module, and the control device can be configured to display a control element on the thin-film display device. In particular, the control element can be displayed at a position where a touch sensor or proximity sensor is integrated into the thin-film display device, the shaped part or in the electronics module. Therefore, the shaped part can not only offer a decorative surface, but it can incorporate display and control functions, for example for seat adjustment, for operating the window controls or adjusting the side mirror, in conjunction with an interior door panel. Virtual control elements can be displayed, and touch sensors or proximity sensors which are aligned with the controls, can receive control commands.

The control device and thin-film display device can also be configured so that a camera image is displayed on the thin-film display device, such as on a camera portion of the thin-film display device, in order to provide a camera monitor which replaces or supplements, for example, the side mirror or other rear-view mirror. Also, a front camera, side camera and/or rear camera can be provided.

The interior trim part further may comprise a tracking device for detecting a gesture, movement of a head and/or eye movement of a driver or another person to determine whether the driver or other person is looking at the camera monitor or intends to look at the camera.

Additionally or alternatively, a second display device for presenting a camera image can be provided, arranged behind the thin-film display device. This second display device can also be used, for example, as a camera monitor to display a camera recording. It can comprise, for example, an HD (high-definition) display. This camera monitor, in conjunction with a rear-facing camera mounted within or on the outer side of the vehicle, could replace or complement a rear-view mirror. In this design, the thin-film display device should be transparent at a position where it overlaps the second display device, or have a cutout, so that the second display device is visible through the thin-film display device in the interior of the motor vehicle.

Also the second display device may comprise an LCD or OLED thin film display, for example. In the following, the camera portion of the thin-film display device and the second display device, both of which can be used to display a camera recording, also are commonly referred to as camera portion. Accordingly, the "camera portion" can be a part of the thin-film display device or can be all or part of the second display device, located behind the thin film display device.

In various examples, the display of a camera recording on the second display device or on the camera portion of the thin-film display device may be controlled in response to an output signal of the tracking device. For example, the display of the camera recording can be made to lighten up and/or to come into focus if the tracking device outputs a signal indicating that the driver looks at the camera portion, and may be dimmed and/or come out of focus if the tracking device outputs a signal indicating that the driver has not looked at the camera portion for a predetermined threshold amount of time.

The tracking device further can be configured to detect a driver's viewing angle relative to the camera portion, wherein the control device can be configured to adjust the display of the camera recording in response to the detected viewing angle.

The interior trim part also may include a blind spot detection device, wherein the control device is configured to generate a warning feature in the display of the camera recording in response to an output signal from the blind spot detection device. The control device further can be configured to generate the same or a different warning feature in the display of the camera recording in response to a driving state of the vehicle and/or in response to the detection of a road condition.

Further, the interior trim part can have a support, on which the shaped part is mounted, wherein the support has a decorative cover layer which is arranged between the support and the shaped part, wherein the shaped part and the thin-film display device are designed such that the decorative cover layer is visible in the interior of the motor vehicle through the shaped part and the thin-film display device. Thus, in a plurality of layers on top of one another, the interior trim part can provide a decorative layer and a variable decorative and/or functional display, and control elements. A functional display refers to a display which not only provides decorative elements and lighting, but also functional elements that relate to the operation of the vehicle, such as virtual control elements and a camera monitor and/or sensors, for example, touch sensors or proximity sensors.

SHORT DESCRIPTION OF DRAWINGS

Examples are described below with reference to the drawings.

DESCRIPTION OF EXAMPLES

Where the spatial relationship of individual parts of the interior trim part is described in the following, this spatial relationship refers to the installed condition, wherein the front of the interior trim part is the side facing towards the passenger compartment and the rear side is facing away from the passenger compartment. The indication that a first part is located in front of or behind a second part means that the first part is located on the side facing the passenger compartment or on the side of the second part facing away passenger compartment, respectively.

Figures 1A, 1B:
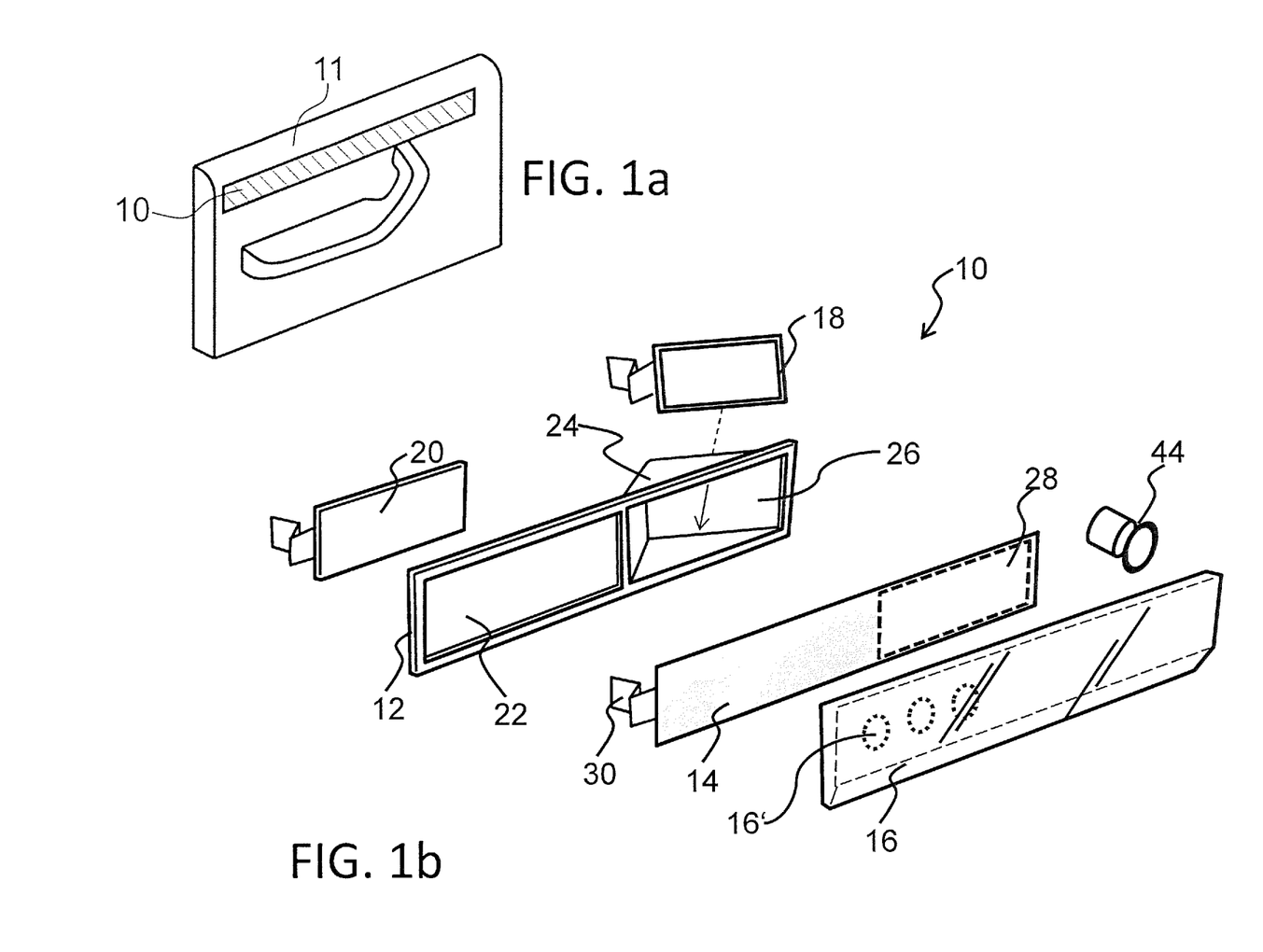
FIG. 1a shows a schematic representation of an interior trim part of a motor vehicle in accordance with one example.
FIG. 1b shows a schematic exploded view of the interior trim part of FIG. 1a in accordance with one example.

FIG. 1a shows an interior trim part 10 which is part of an interior door panel 11. The interior trim part 10 can be adapted to the shape of the interior door panel 11 and shaped three-dimensionally. In other words, its surface facing to the passenger compartment can be curved or arched and may also be designed coplanar to the surface of the interior door panel 11 and/or flush with the interior door panel, in which it is inserted. Alternatively, the interior trim part 10 can also have a plane surface. In this example the interior trim part 10 forms an insert of the interior door panel, or an appliqué. Other types of application are possible, for example, as part of an instrument panel or in a central console.

FIG. 1b shows an example of an interior trim part 10 schematically and in an exploded view. The interior trim part 10 in this example comprises a frame or support 12, a thin-film display device 14, a shaped part 16, a monitor 18, and an electronics module 20. The electronic module 20 is a control device for controlling the thin film display device and the monitor 20. For simplicity, the thin-film display device 14 is designated from now on as a "thin film display portion" or just as a "thin-film display". A detection device 44 for detecting and tracking a gesture, movement of a head and/or eye movement of a driver, such as an infrared sensor or camera, can be integrated in the interior trim part, such as in the shaped part 16. To this end, the shaped part 16 may comprise an opening 16" for receiving a tight receiving portion of the detection device 44.

The support 12 can be made from plastic or a fibre-reinforced composite material and is used for mounting and aligning at least some or all of the parts of the interior trim part. In the example shown here, it has a cut out or a recess 22 for receiving the electronic module 20, and a bay 24 for receiving the monitor 18. The bay 24 is referred to as such because, from the point of view of the passenger compartment, it forms a cut out in the support 12, so that the monitor 18, if it is arranged on the rear 26 of the bay 24, is set back relative to the front face or front of the support 12. The rear side 26 which is used for mounting the monitor, is oriented at an angle to the surface of the support 12 in such a way that the monitor 18 can be clearly viewed by the driver. The thin-film display 14 is mounted on the front side or front of the support 12. The thin-film display can also be integrated or embedded in the shaped part, or be configured in a sandwich structure with the shaped part.

The thin-film display 14 can be or comprise, for example, an OLED (organic light-emitting diode), TFT (Thin Film Transistor), LCD (Liquid Crystal) or SED (surface conduction electron emitter) display. The following discussion deals with the example of an OLED display in further detail.

OLED displays are composed of a plurality of organic layers. An anode layer, consisting for example of indium tin oxide (ITO), is arranged on a support which can be formed of a thin glass or plastic substrate. The support can be flexible. Above the anode layer, a hole transport layer (HTL) is positioned. An organic emitter layer (EL) can be applied to the HTL which either contains dye (5 to 10 to percent) or consists completely of dye. An electron transport layer (ETL) is optionally applied thereon. Finally, a cathode, consisting of a metal or an alloy with low electron work function, such as calcium, aluminium, barium, ruthenium, magnesium-silver alloy, is deposited by evaporation. As a protective layer and to reduce the injection barrier for electrons, a very thin layer of lithium fluoride, caesium fluoride or silver can be deposited between the cathode and ETL.

One of the features of OLED display screens is the very high contrast, since they can work successfully without backlighting: black pixels emit no light. While LCDs, for example, act as coloured filters and some light still shines through even in the dark state, OLEDs emit coloured light only when activated which also ensures very good colour rendition. This method is efficient which means OLEDs, in particular when displaying dark images, require less energy.

The thin-film display 14 can be designed in such a way that, by applying a charging voltage to the display, the image area can transition from a transparent state to a translucent state, by a portion, or even all, of the wavelengths of light being blocked. The thin-film display 14 therefore, when it is not activated, is transparent and in or behind the shaped part, is almost visually imperceptible. If it is being activated, in order to display an image on the thin-film display 14, it transfers to the translucent state. The thin-film display 14 is coupled to the electronics module 20 via a connecting cable 30 and is controlled thereby.

The electronics module 20 can control the thin-film display 14 to display a decorative surface, to display control elements or to display a camera image, for example, the image of a backward-directed camera which replaces or complements a rear-view mirror. The different types of display can be presented alternatively or else simultaneously and, under certain circumstances, can also be superimposed.

In the example of FIG. 1*b*, the thin-film display 14 comprises a display portion and a transparent region 28 which can be formed by a physical cutout in the thin-film display 14. Alternatively, the transparent region 28 can be controlled by the corresponding region 28 of the thin-film display 14 being de-energized, so that it is transparent when required. If the transparency is not required, the region 28 can also be activated to display an image. This is explained in further detail in relation to FIGS. 4*a* to 5. The monitor 18 may be perceived by passengers of the vehicle through the transparent region 28 which may be an opening or which may be a particularly controlled portion of the thin film display 14.

The interior trim part 10 is closed off to the passenger compartment by the shaped part 16. The shaped part 16 can also be fixed to the support 12. In an example it comprises of a single- or multi-layered glass structure. On the side of the shaped part facing the interior of the vehicle, a coating may be applied. This protects the interior trim part 10 against scratches, contamination by dirt, the effect of liquids and the like. The shaped part can also comprise one or a plurality of layers of plastic, e.g. of FR4 (a highly flame-resistant and flame retardant composite material including epoxy resin and fibreglass fabric), PES (polyester) or PC-PMMA (polycarbonate polymethyl-methacrylate) or can be constructed with another thin-film substrate. A printed circuit board or a set of electronics and/or optics applied by other means can be mounted directly on the material of the shaped part and/or be integrated therein. The electronics and/or optics can comprise, for example, LEDs, microchips, sensors and/or display components, such as an OLED display, LCD or ITO thin film display, and touch sensors or proximity sensors. To assemble the electronics, semiconducting and conducting layers and insulators can be deposited on or in the material of the shaped part. Appropriate techniques are known from semiconductor component manufacturing. In the shaped part 16 a pattern 16' can be incorporated, for example for labelling a control element, such as a touch sensor or proximity sensor. At the respective location, a touch sensor or proximity sensor, for example, a capacitive sensor, switch, slider or the like, can be integrated directly into the shaped part. The thin-film display 14 and the shaped part 16 can be glued and/or aligned and fixed relative to each other using the support 12.

In the example of FIG. 1*b*, the bay 24 is formed in the support 12 which holds the monitor 18. The monitor 18 can provide a high-resolution display of a camera image which replaces or complements the side mirror. An HD (high-definition) monitor may be used, such as is known from television technology. If the interior trim part is part, for example, of an instrument panel, then the monitor 18 could also replace or complement the central rear-view mirror. Another camera image, e.g. from a frontal camera, can optionally be displayed on the monitor 18. The monitor 18 can also be used to display images from another source, such as a television receiver or a SIM card, a USB stick or flash memory, an app interface or a DVD player or a streaming service.

Instead of a monitor a projection system, e.g. a nano-projector or pico-projector, can also be integrated into the interior trim part which projects a camera image onto a side window or the windscreen, for example, in the manner of a head-up display. In this case, a corresponding routing of the light through the interior trim part must be provided. The glass of the window pane or windscreen can then serve as a projection surface, and a transparent electronic display can be integrated into the glass or be mounted thereon. The light source can be provided by light-emitting diodes, and the brightness of the image may be controlled via a photo sensor as a function of the ambient light. The image itself can be generated, for example, by a coloured high-resolution TFT or LCD display.

The electronics module 20 can drive the monitor 18 or other display device which is integrated in the support 12, such as a head-up display. Further details of the example shown here are explained with reference to FIGS. 4*d* and 5.

Figure 2:
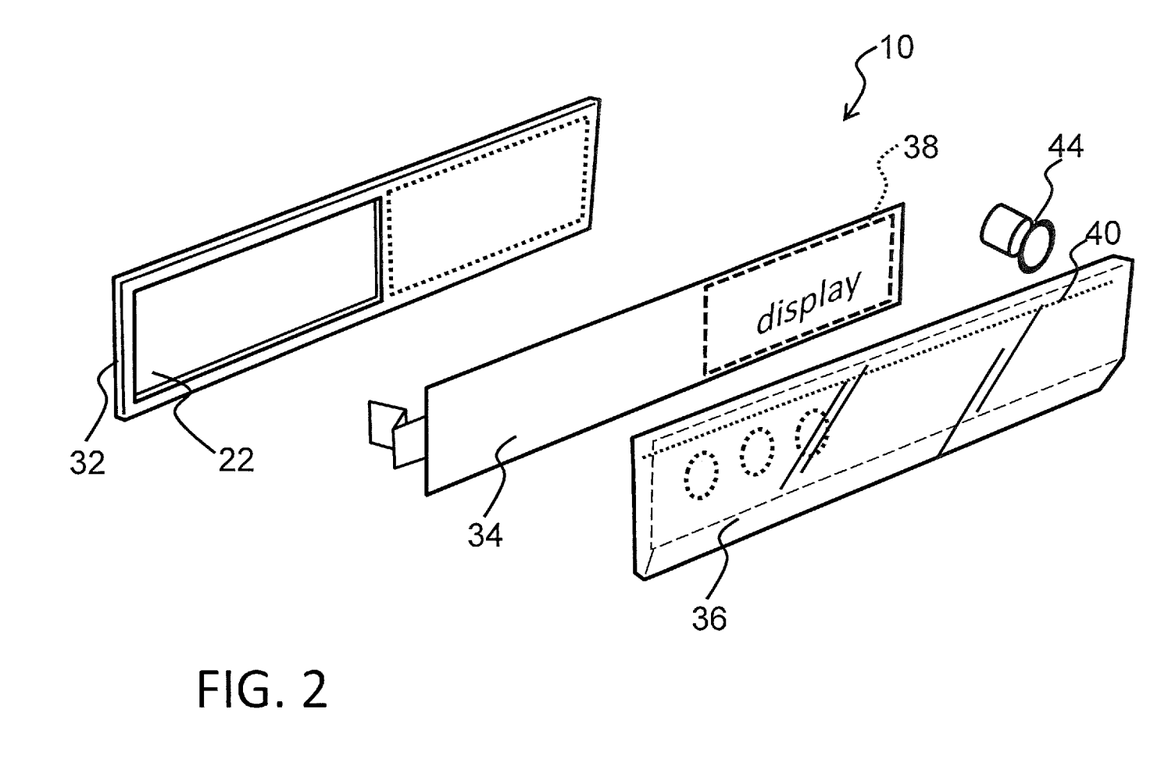
FIG. 2 shows a schematic exploded view of the interior trim part of FIG. 1a in accordance with another example.

FIG. 2 shows an alternative design of the interior trim part 10. The same reference numerals are used to designate corresponding components. The interior trim part 10 comprises a support 32, a thin-film display 34 and a shaped part 36 which can be designed in a similar way to the design of FIG. 1. The support 32 has a cut out 22 for receiving an electronics module which is not shown in FIG. 2, and can essentially correspond to the electronics module 20 of FIG. 1b. The support 32 does not have a bay however, but has a closed surface next to the cut out 22. The trim part also comprises the gesture, head and/or eye movement detection and tracking device 44.

The thin-film display 34 can comprise, as in FIG. 1b, for example, an OLED (organic light-emitting diode), TFT (Thin Film Transistor), LCD (Liquid Crystal display) or SED (surface conduction electron emitter) display. Reference is made to the description above. Where the thin-film display 14 of FIG. 1b has the transparent region 28, the thin-film display 34 of the design of FIG. 2 has a dedicated display region 38 which can be used for displaying a camera image which replaces or complements a rear-view mirror. The dedicated display region corresponds to the monitor 18 of FIG. 1. An additional monitor or other display system for displaying a camera image is not provided in this design.

The display region 38 can also be used to display images, including moving images, from any other source, including another camera, a television receiver, a SIM card, a USB stick or flash memory, an app interface, a DVD player and a streaming service.

The shaped part 36 can, in principle be configured as described with reference to FIG. 1b, for example, with a single-layered or multi-layered glass structure. Reference is made to the description above. The dotted line 40 indicates that the thin-film display 34 can be integrated or embedded in the shaped part 36. At the position of the line 40 an internal optics of the shaped part may also be produced, for example, by laser processing. Alternatively, the thin-film display can also be arranged on the rear of the shaped part 36. Optical elements can be implemented in or on the shaped part.

Figure 3A:
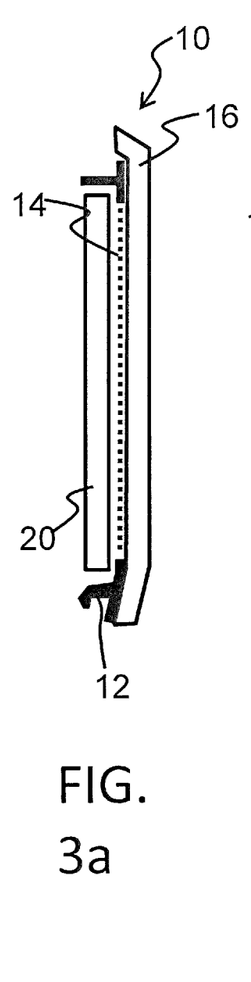
FIG. 3a shows a schematic cross-sectional view through the interior trim part of FIG. 1a or FIG. 2 in accordance with an example.
Figure 3B:
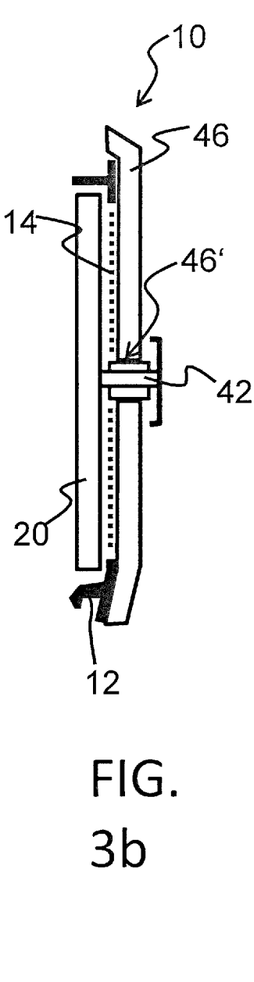
FIG. 3b shows a schematic cross-sectional view through a variant of the interior trim part of FIG. 1a or FIG. 2 in accordance with an example.
Figure 3C:
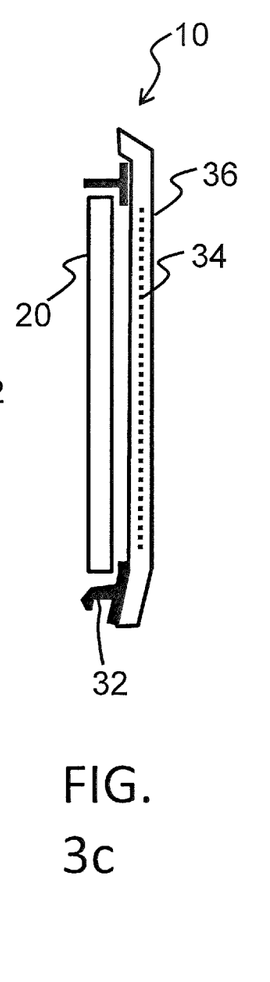
FIG. 3c shows a schematic cross-sectional view through a further variant of the interior trim part of FIG. 1a or FIG. 2 in accordance with an example.

FIGS. 3a to 3c show a cross-sectional view through various examples of the interior trim part 10. The cross-sections each run in a sectional plane which passes through the part of the support 12 with the cutout 22. The bay 24 and the monitor 18 of FIG. 1b are therefore not visible.

The configuration shown in FIG. 3a generally corresponds to the interior trim part of FIG. 1b. The same reference numerals are used to designate corresponding components. From the sectional view it is possible to identify the structure with the support 12, thin-film display 14, the shaped part 16 and the electronics module 20. The thin-film display 14 in this example is located between the shaped part 16 and the electronics module 20 and is framed by the support 12. Means for mounting the interior trim part 10 on the vehicle are integrated in the support 12, and indicated here schematically by a hook-shaped projection. Sensors for forming control elements in the interior trim part 10 may be implemented, if appropriate, by touch sensors or proximity sensors which are integrated in the shaped part 16 and/or the thin-film display 14. This is explained in more detail with reference to FIG. 4a.

FIG. 3b shows a variation of the design of FIG. 3a, wherein the same reference numerals are used to designate corresponding components. The shaped part 46 is modified in such a way that it has an opening 46', in which a pushbutton switch 42 is housed. The pushbutton switch 42 is coupled with the electronic module 20 and can be used as control elements for controlling vehicle functions, for example for controlling the vehicle seat adjustment and/or the window winder, or else for controlling the appearance of an image on the thin-film display 14 or the monitor 18, to name just a few examples.

FIG. 3c shows another variation, wherein the same reference numerals are used to designate corresponding components. This design is explained with reference to the example of FIG. 2 and comprises the support 32, the thin-film display 34, the shaped part 36 and the electronics module 20. As shown, the thin-film display 34 is embedded in the shaped part 36 and, therefore protected on all sides by the shaped part 36. Sensors for forming control elements in the interior trim part 10 may be implemented, if appropriate, by touch sensors or proximity sensors which are integrated in the shaped part 16 and/or the thin-film display 14.

FIGS. 4a to 4d show different examples of the use of the thin-film display device 14 or 34 of the interior trim part 10. The illustrations of FIGS. 4a to 4d each show a plan view of the interior trim part 10 or the shaped part forming the cover of the interior trim part. The thin-film display is visible through the shaped part.

Figure 4A:
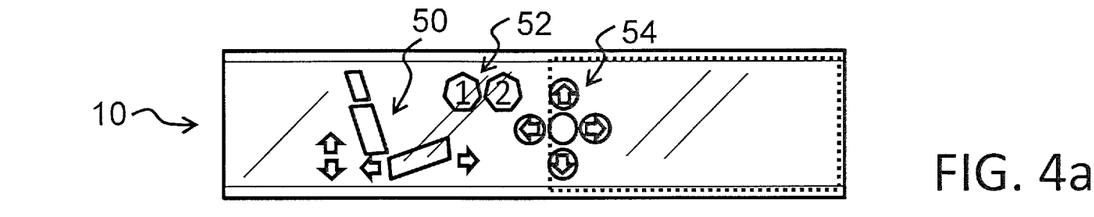
FIGS. 4a to 4d show different examples of the use of the thin-film display device of the interior trim part.

FIG. 4a illustrates the display of control functions in the form of virtual control elements or icons on the thin-film display. In this example, symbols or icons for seat adjustment so, including a memory function 52, for setting a seat heater and/or for side mirror adjustment 54 are shown on the thin-film display. At the position of these virtual control elements, touch sensors or proximity sensors are located in the shaped part and/or in the thin-film display which can detect a contact and/or movement of an object over the surface of the shaped part. The underlying technology is known in principle based on the operation of touch-sensitive screens, such as those used in smart phones. The signals detected by the touch sensors or proximity sensors are forwarded to the electronics module 20 and processed, to trigger appropriate positioning operations.

Figure 4B:
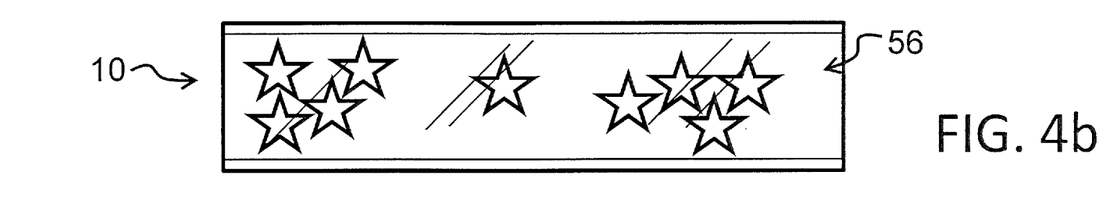
Figure 4C:
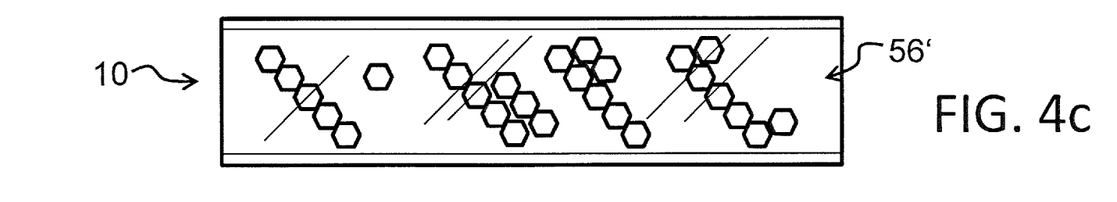

FIGS. 4b and 4c illustrate the presentation of a decorative graphic 56 on the thin-film display of the interior trim part. The decorative graphic may comprise any desired patterns, images, surface textures and the like, and is visually perceptible through the transparent shaped part. If such a decorative graphic is displayed on the thin-film display, this visually conceals the underlying structures of the interior trim part 10. FIG. 4c illustrates the fact that a driver can change the display of the decorative graphic 56' on the thin-film display as desired.

Figure 4D:
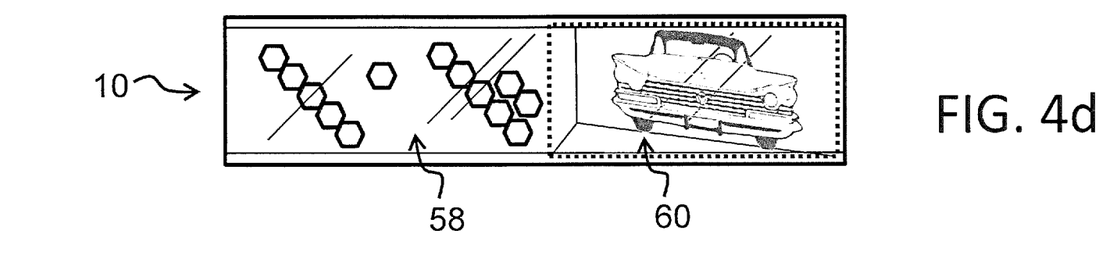

The illustration of FIG. 4d corresponds to the design of FIG. 1b, in which in addition to the thin-film display an additional monitor is integrated into the support. In this example, the thin-film display is activated such that it displays a decorative graphic in a region 58 of the interior trim part and in the region 60 which is located above the monitor, is transparent. In this example, the region 58 contains the decorative graphic, but no functional units. In other examples, one or more functional units can also be integrated into the region 58. The transparency of the region 60 can be achieved by the thin-film display not being activated in the region which is located above the monitor. Alternatively, the thin-film display can have a cut out at this position. The monitor which is located in the support bay, displays a camera image that corresponds to the reflection of a side mirror which it thus replaces or complements. This design is explained in greater detail with reference to FIG. 5.

Figure 5:
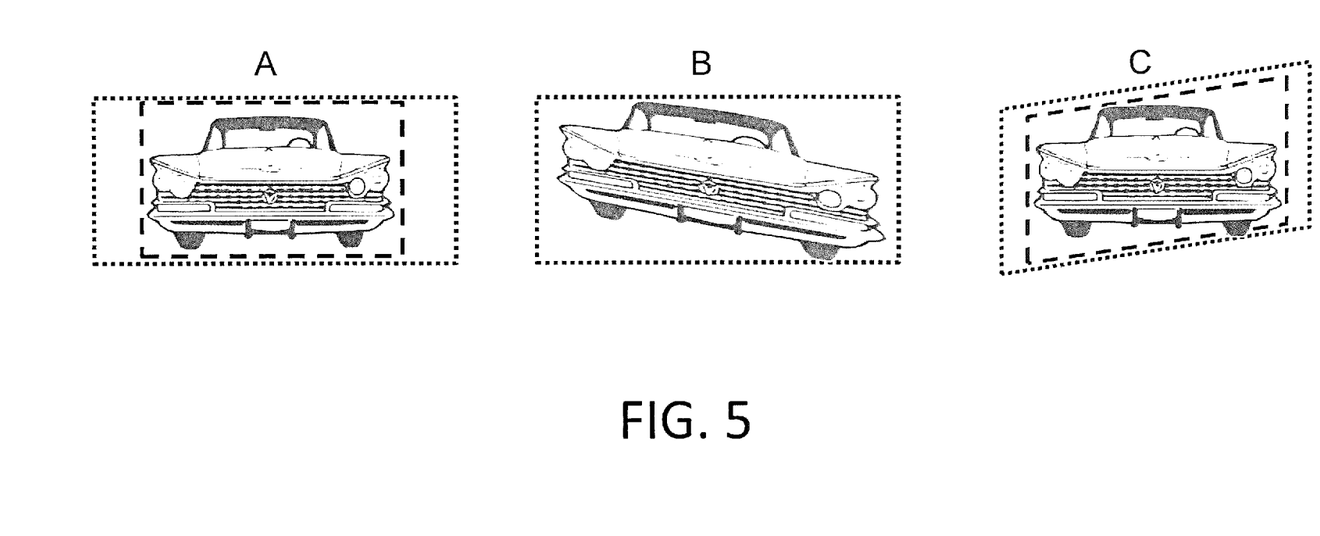
FIG. 5 shows an example of the use of the interior trim part of FIG. 2.

FIG. 5 illustrates the region 60 of the interior trim part which is located above the monitor. FIG. A shows an image, such as is seen by a driver looking at a side mirror. The image is as seen by a rear-facing camera. FIG. B illustrates a corresponding image as it is displayed on the monitor, to compensate for distortions caused by the tilt of the monitor and the viewing angle of the vehicle driver on the monitor. The camera image on the monitor in this example is shown inclined at an angle to the horizontal and slightly distorted, to generate the view shown in FIG. C from the point of view of the driver. As a result, the arrangement of the monitor on the rear side 26 of the bay 24, as shown in FIG. 1b, is taken into account. The tilt of the monitor relative to the surface of the interior trim part and relative to the usual orientation of a side mirror can thus be compensated for, wherein this inclined position offers a good compromise between the arrangement of the monitor in the interior trim part and a good orientation of the monitor relative to the vehicle driver.

The interior trim part can provide additional control features for enhancing the display of a camera image on the monitor, as illustrated below.

Figure 6:
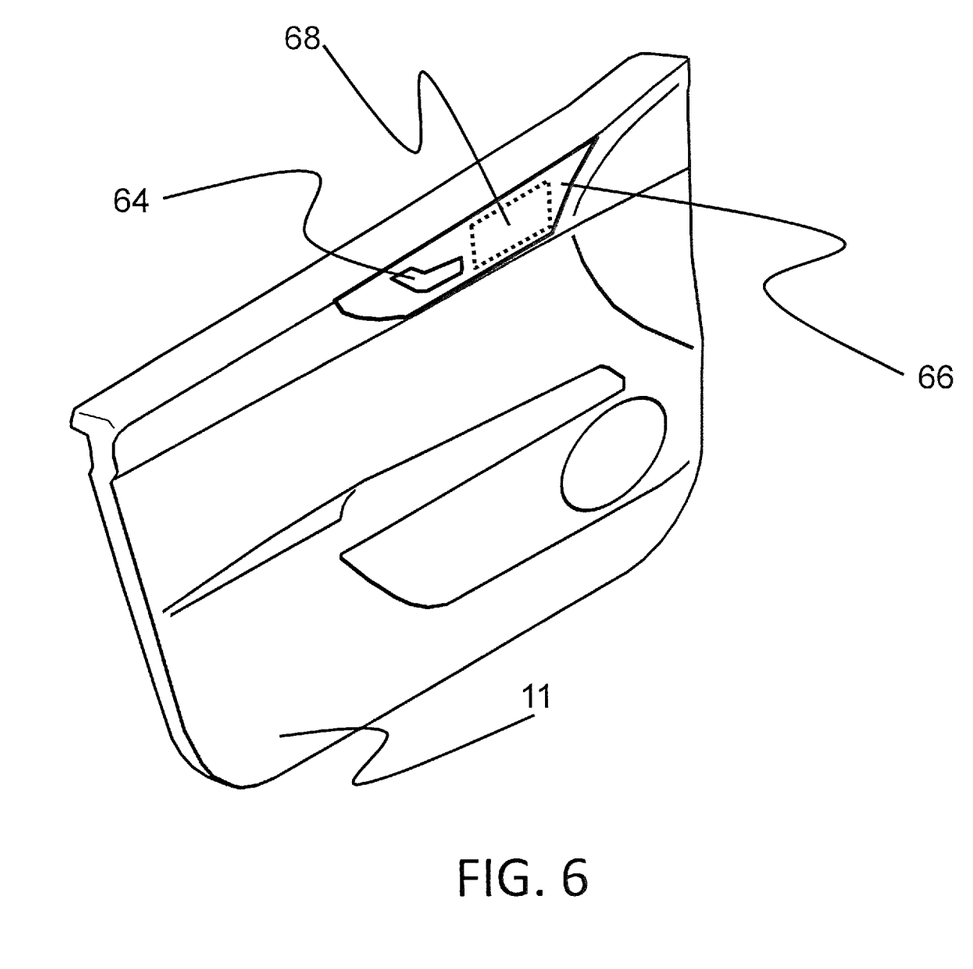
FIG. 6 shows a schematic representation of an interior trim part of a motor vehicle in accordance with a further example.

FIG. 6 shows a schematic diagram of an interior trim part according to a further example. The trim part is part of an interior door panel 11 and includes a thin-film display portion 64 and a monitor portion 68 which may be combined with a shaped part 66 and further components to form a trim part in a manner as described above. The thin film display portion 64 and the monitor portion 68 may be distinct portions of one thin-film display device or maybe separate display devices, with the monitor portion 68 arranged behind the thin film display portion 64, in or at a cut out of the thin film display portion 64 or adjacent to the thin film display portion 64. In the example of FIG. 6, the thin film display portion 64 and the monitor portion 68 are generally arranged in or adjacent to the same plane, side by side. Concerning further details of the thin film display portion 64 and the monitor portion 68 and their arrangement in the trim part, reference is made to the above description.

Figure 7:
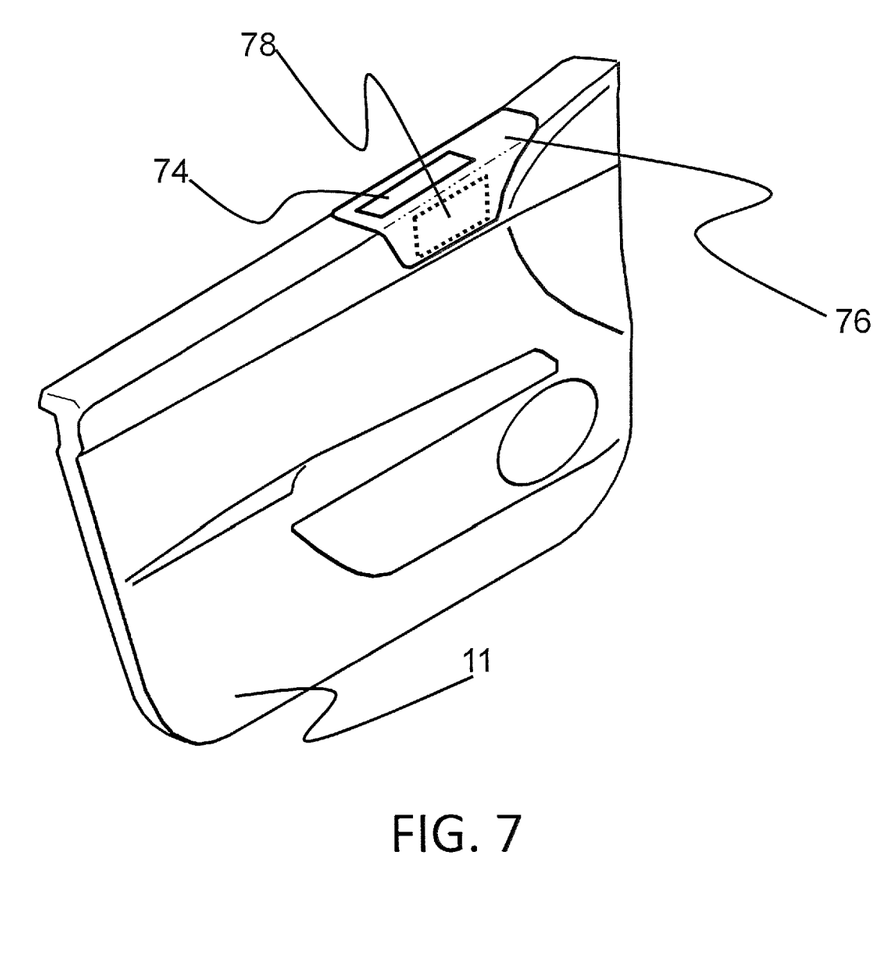
FIG. 7 shows a schematic representation of an interior trim part of a motor vehicle in accordance with a further example.

A further example of an interior trim part is schematically shown in FIG. 7. Also the trim part of FIG. 7 is part of an interior door panel 11 and includes a thin-film display portion 74 and a monitor portion 78 which may be combined with a shaped part 76 and further components to form a trim part in a manner as described above. The thin film display portion 74 and the monitor portion 78 may be distinct portions of one thin-film display device or maybe separate display devices, with the monitor portion 78 arranged behind the thin film display portion 74 in or at a cut out of the thin film display portion 74 or adjacent to the thin film display portion 74. In the example of FIG. 7, the thin film display portion 74 and the monitor portion 78 are arranged in different planes, with the thin-film display portion 74 being located at a generally horizontal top portion of the trim part and the monitor portion 78 being located at a generally vertical side portion of the trim part. The thin film display portion 74 and the monitor portion 78 can be located so that they are easily handled and viewed by a driver, according to their specific functionality. Concerning further details of the thin film display portion 74 and the monitor portion 78 and their arrangement in the trim part, reference is made to the above description.

Figure 8:
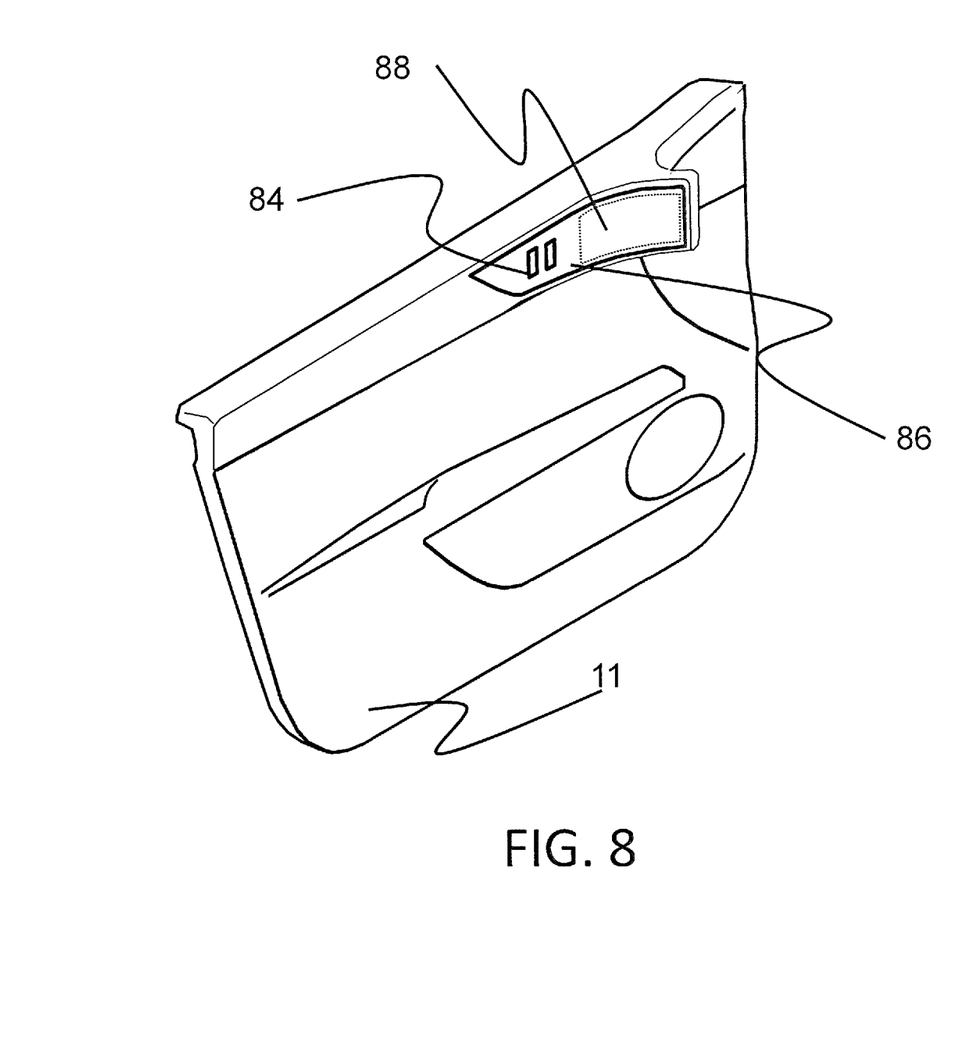
FIG. 8 shows a schematic representation of an interior trim part of a motor vehicle in accordance with a further example.

A further example of an interior trim part is schematically shown in FIG. 8. Also the trim part of FIG. 8 is part of an interior door panel 11 and includes a thin-film display portion 84 and a monitor portion 88 which may be combined with a shaped part 86 and further components to form a trim part in a manner as described above. The thin film display portion 84 and the monitor portion 88 may be distinct portions of one thin-film display device or maybe separate display devices, with the monitor portion 88 arranged behind the thin film display portion 84, in or at a cut out of the thin film display portion 84 or adjacent to the thin film display portion 84. In the example of FIG. 8, the thin film display portion 84 and the monitor portion 88 are arranged in a curved trim part wherein, in particular, the monitor portion 88 provides a curved monitor display which is arranged relative to the driver or other passenger of the vehicle so that it can be viewed easily by the driver or other passenger being seated in the vehicle. As in the previous examples, the monitor portion 88 can comprise its dedicated thin-film display which is arranged behind a transparent part of the thin film display 84 or in a cut out of the thin film display 84. The monitor portion 88 also can be a dedicated portion of a thin-film display which includes the thin film display portion 84 and the monitor portion 88. Concerning further details of the thin film display portion 84 and the monitor portion 88 and their arrangement in the trim part, reference is made to the above description.

Figure 9:
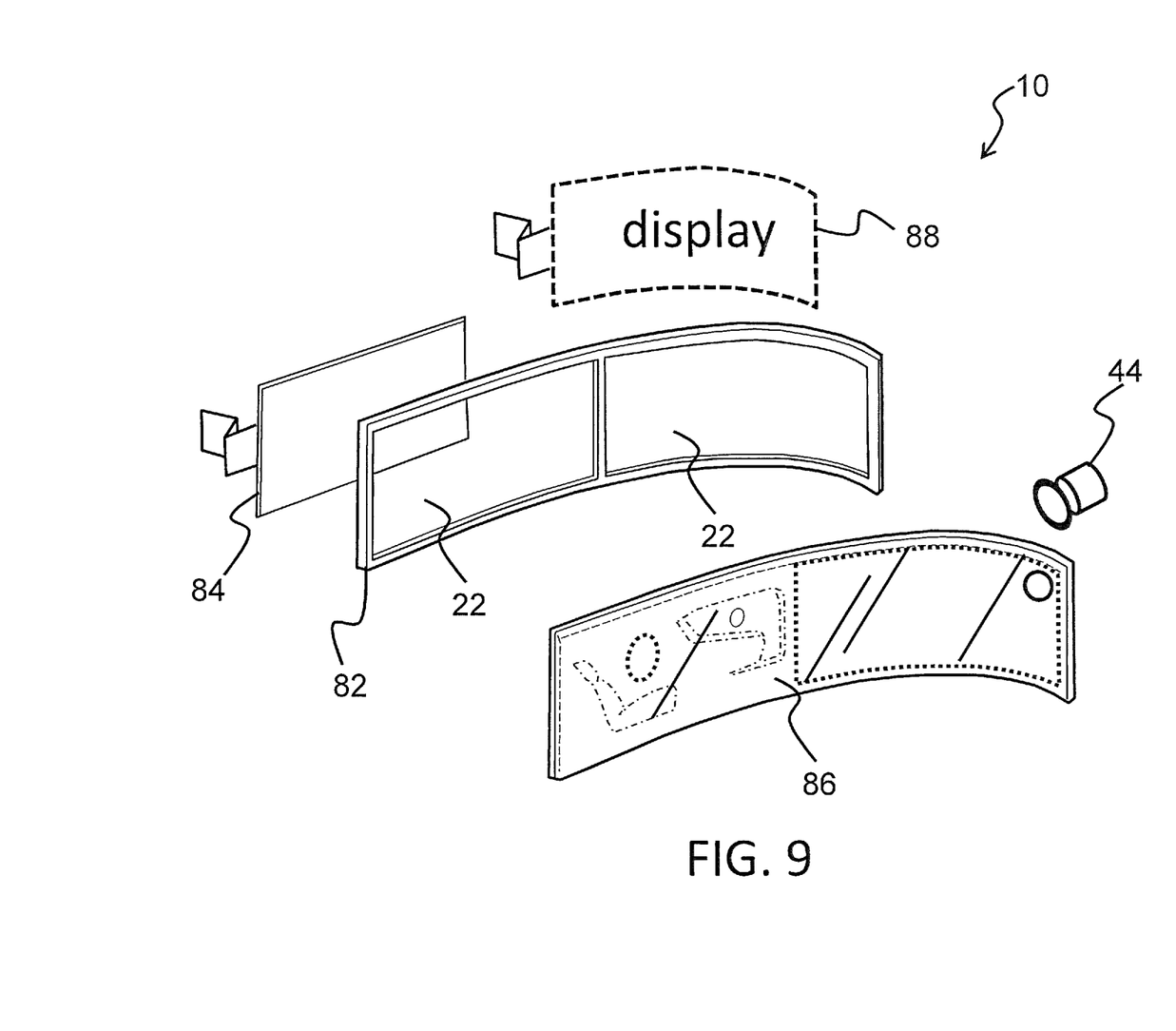
FIG. 9 shows a schematic exploded view of the interior trim part of FIG. 8 in accordance with another example.

One example of a portion of an interior trim part as shown in FIG. 8 is illustrated in further detail in FIG. 9. The same reference numbers are used as in the description of the previous examples. The trim part 10 comprises a support 82 having two cut outs 22 to form a frame, a thin-film display 84 located in one of the cutouts 22 and a monitor display 88 located in the other cut out 22. A shaped part 86 is arranged at front side of the support 82, the thin film display 84 and the monitor display 88. The support 82 features a curved shape in the portion for receiving the monitor display 88. The shaped part 86 has a corresponding curved shape, co-extending with the support 82. The shaped part 86 is formed from a transparent material, such as transparent plastic or glass. Icons symbolizing controls, such as controls for adjusting a passenger seat and/or lighting and/or heating, may be printed or engraved on the shaped part 86, as shown in FIG. 9, and additionally or alternatively may be displayed on the thin film display 84.

A control device, such as an electronic module, may be provided and operatively coupled to the thin film display portion 84 and monitor portion 88 but is not shown in the drawings. A gesture, head and/or eye movement detection and tracking device 44 may be located at or behind the shaped part 86 and may be exposed through an opening provided therein. For further details, such as concerning the implementation of the thin film display portion 84 and monitor portion 88, reference is made to the above description of different examples.

The monitor portion 88 can be used as a camera monitor for displaying the recording of a camera arranged to record images of the vehicle exterior or, optionally, also images of the vehicle interior. In one example, at least one camera is arranged at the vehicle to record the exterior of the vehicle to generate dynamic images which correspond to images usually shown by a rear mirror. However, the camera can be arranged such that it captures dynamic images which go beyond those which a rear mirror usually is able to capture; and the monitor portion 88 is capable of displaying such images with enhanced features, some of which are described below.

In one or more examples, the at least one camera can be arranged such that it detects dynamic images also in those areas which usually would lie in a blind spot area of a driver. Accordingly, the at least one camera can be used for blind spot detection and the monitor portion 88 can be controlled to display a warning feature when an approaching object is detected in the blind spot area. For example, when a vehicle is approaching from behind on a different lane, the at least one camera may detect the vehicle. If it is still far away, there may be no additional information provided by the monitor display 88. However, when the approaching vehicle comes within a few meters of the vehicle having the trim part, the monitor portion can display a warning feature in a dedicated area, such as a red light icon, red light stripe or flashing red light or the like. The monitor portion also could display a feature symbolizing the approaching vehicle, an arrow pointing in the direction where the vehicle is approaching from, or the like. As the vehicle continues to approach, the warning feature may move across the monitor portion 88 to illustrate the approaching vehicle. Further, the color of the warning feature may change.

The monitor portion 88 also can be controlled for image enhancement, such as providing augmented information. For example, in a no passing zone, the middle lane marking of a road may be overlaid by a red line in the rearview camera image. Additionally, as a further example, if a driver were to use the left turn signal in a no passing zone to start overtaking the vehicle, the red light stripe could start sending an additional warning by changing color or flashing. As another example, if the vehicle is in reverse gear, street lanes and the vehicle's projected path may be shown as overlays in a rearview camera image.

In one or more examples, it further is possible to control the monitor portion in such a way that it is in an idle mode or standby mode while not needed, in order to avoid distracting the driver by moving images. The detection device 44 may be used to detect a gesture of the driver, head movement of the driver or the driver looking at the monitor portion. Upon detection of a gesture, head or eye movement of the driver, the monitor portion 88 may wake up instantly to light up and bring into focus the rearview camera image displayed on the monitor portion 88. The monitor portion 88 may be controlled such that the image is displayed for a predetermined amount of time after a respective gesture, head movement or eye movement of the driver has been detected and/or as long as a respective gesture, movement or eye movement of the driver is detected plus a threshold time.

Alternatively or additionally, the monitor portion 88 may be activated by pressing a respective bottom (not shown) displayed on the monitor portion 88 or provided outside of the monitor portion for activating and/or setting the display of the camera image. Also the detection device 44 may be activated in this way. Additionally, the detection device 44 may be used for tracking the driver's eye movement and adjusting the camera and display of camera image on the monitor portion 88 accordingly.

What is claimed is:

1. An interior trim part of a motor vehicle, comprising:
a shaped part which is arranged on a side of the interior trim part to face an interior of the motor vehicle,
one or more control function image(s) to adjust at least one operator adjustable operating function(s) of the motor vehicle, comprising touch sensors or proximity sensors for controlling a vehicle function,
a camera display whereby the control function image(s) does/do not overlie the camera display,
a thin-film display device which, as seen from the motor vehicle interior, is arranged behind the shaped part or is integrated therein, the control function image(s) disposed on the thin-film display device wherein said touch sensors or proximity sensors are integrated into at least one of the thin-film display device,
a control device configured to activate the thin-film display device such that the thin-film display device transmits the control function image(s) through the shaped part into the interior of the motor vehicle,
wherein the control device is further configured to display camera images on the camera display,
wherein the interior trim part is an applique of an interior door panel,
wherein the camera display is arranged on the interior door panel such that the camera images are viewable by a driver of the motor vehicle, whereby the camera images replace or supplement images from a side-view mirror of the motor vehicle;
wherein the camera display is provided by a second display device which is arranged behind the thin-film display device, and the control device is configured to display the camera images on the second display device and wherein the thin-film display device is transparent or translucent at a position where it overlaps the second display device so that the second display device is visible in the interior of the motor vehicle through the thin-film display device.

2. The interior trim part according to claim 1, wherein the shaped part comprises at least one glass layer.

3. The interior trim part according to claim 1, wherein the shaped part has a multi-layered structure, at least one of the layers being made of glass.

4. The interior trim part according to claim 1, wherein the shaped part is formed in three dimensions.

5. The interior trim part according to claim 1, wherein the shaped part is transparent or partially transparent.

6. The interior trim part according to claim 1, wherein the thin-film display device comprises an OLED (organic light-emitting diode) display, TFT (Thin Film Transistor) display, LCD (liquid crystal) display, or SED (surface conduction electron emitter) display.

7. The interior trim part according to claim 1, wherein the thin film display device comprises a transparent or partially transparent display.

8. The interior trim part according to claim 1, wherein touch sensors or proximity sensors are integrated into at least one of the thin-film display device and the shaped part.

9. The interior trim part according to claim 1, wherein the control function image(s) is/are at a position where a touch sensor or proximity sensor is integrated into at least one of the thin-film display device and the shaped part.

10. The interior trim part according to claim 1, wherein the control function image(s) comprises one or more seat adjustment image(s).

11. The interior trim part according to claim 1 further comprising a tracking device for detecting a gesture, movement of a head and/or eye movement.

12. The interior trim part according to claim 1, wherein the second display device comprises a LCD or OLED thin film display.

13. The interior trim part according to claim 11, wherein the control device is configured to control the display of the camera images in response to an output signal of the tracking device.

14. The interior trim part according to claim 13 wherein control device is configured to control the display of the camera images:
to lighten up if the tracking device outputs a signal indicating that the driver looks at the camera region or the second display device, and
to be dimmed if the tracking device outputs a signal indicating that the driver has not looked at the camera region or the second display device for a predetermined threshold amount of time.

15. The interior trim part according to claim 11, wherein the tracking device is configured to detect a driver's viewing angle relative to the camera region or the second display device and wherein the control device is configured to adjust the display of the camera images in response to the detected viewing angle.

16. The interior trim part according to claim 1, further comprising a blind spot detection device, wherein control device is configured to generate a warning feature in the display of the camera images in response to an output signal from the blind spot detection device.

17. The interior trim part according to claim 1, wherein said control device is configured to generate a warning feature in the display of the camera images in response to a driving state of the vehicle and/or in response to the detection of a road condition.

18. The interior trim part according to claim 1 which also comprises a support, on which the shaped part is mounted, wherein the support has a decorative cover layer which is arranged between the support and the shaped part, wherein the shaped part and the thin-film display device are designed such that the decorative cover layer is visible in the interior of the motor vehicle through the shaped part and the thin-film display device.

19. The interior trim part of claim 1 wherein said thin-film display, at the location where it overlaps the second display, and in response to a charging voltage, transitions from a transparent state to a translucent state wherein a portion or all of the wavelength of light is blocked.

20. The interior trim part of claim 19 wherein said thin-film display, at the location where it overlaps the second display, and in response to a charging voltage, transitions from a transparent state to a translucent state wherein all of the wavelength of light is blocked.

21. The interior trim part of claim 1 further including a frame for mounting said shaped part, said camera display, and said thin-film display, wherein said frame has a front face and a bay for receiving said camera display, wherein an image on said camera display compensates for distortions caused by the camera display position and the viewing angle of a driver.

22. The interior trim part of claim 21 wherein said camera is tilted relative to said front face of said frame and an image displayed by said camera compensates for said tilt of said camera.

23. An interior trim part of a motor vehicle for a vehicle driver which comprises:
    a frame which is arranged on a side of the interior trim part to face an interior of the motor vehicle having a front face and a bay for receiving a camera display;
    a thin-film display device, which, as seen from the motor vehicle interior, is arranged behind the frame or is integrated therein including, in said thin-film display, one or more control function image(s) to adjust at least one operator adjustable operating function(s) of the motor vehicle, comprising touch sensors or proximity sensors for controlling a vehicle function;
    a control device for activating the thin-film display device so that the latter transmits an image into the interior of the motor vehicle; and
    a camera display arranged in said bay
    wherein the camera display is provided by a second display device which is arranged behind the thin-film display device, and the control device is configured to display a camera image on the second display device and wherein the thin-film display device is transparent or translucent at a position where it overlaps the second display device so that the second display device is visible in the interior of the motor vehicle through the thin-film display device.

24. The interior trim part of claim 23 further comprising a tracking device for detecting a gesture, movement of a head and/or eye movement.

25. The interior trim part of claim 23 wherein said thin-film display at a position where it overlaps the second display device, in response to a charging voltage, transitions from a transparent state to a translucent state wherein a portion or all of the wavelength of light is blocked.

26. The interior trim part of claim 23 wherein said thin-film display at a position where it overlaps the second display device, in response to a charging voltage, transitions from a transparent state to a translucent state wherein all of the wavelength of light is blocked.

27. The interior trim part of claim 23 wherein said camera is tilted relative to said front face of said frame and an image displayed by said camera compensates for said tilt of said camera.

28. The interior trim part of claim 23 wherein an image on said camera display compensates for distortions caused by the display position and the viewing angle of the driver.

* * * * *